Dec. 29, 1931.　　　L. LAWRASON　　　1,838,848
METHOD OF AND APPARATUS FOR DEHYDRATING EMULSIONS
Filed Aug. 8, 1927
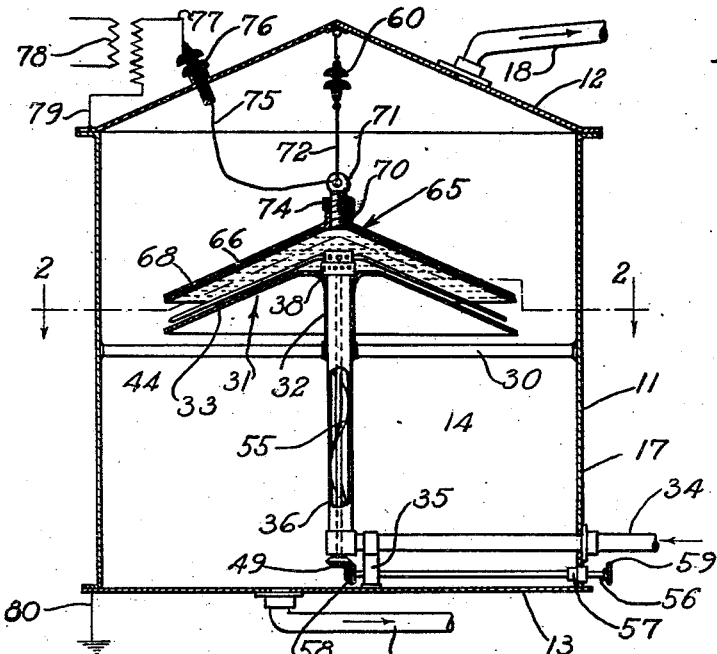
Fig.1.
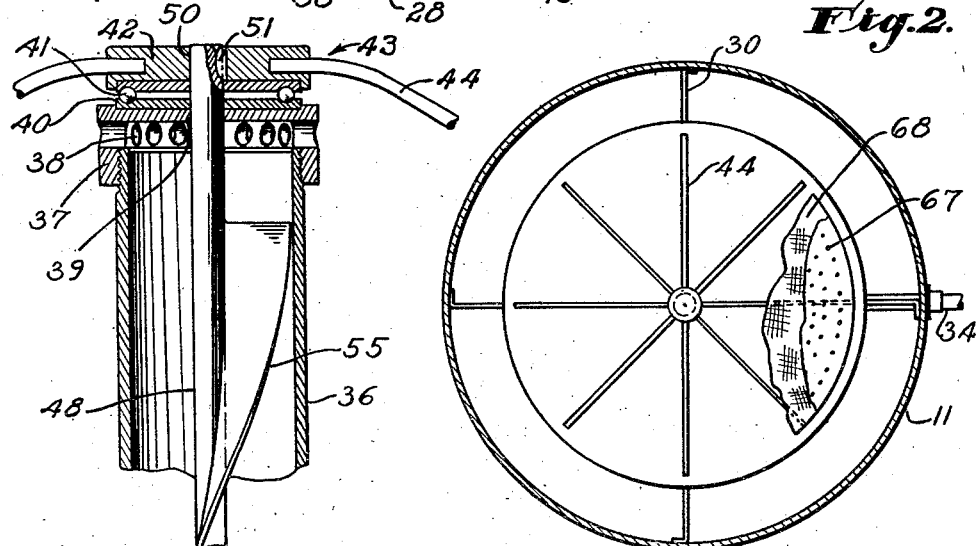
Fig.2.
Fig.3.
INVENTOR:
LEVERING LAWRASON,
BY
Fred W. Lawin
ATTORNEY.

Patented Dec. 29, 1931

1,838,848

UNITED STATES PATENT OFFICE

LEVERING LAWRASON, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF AND APPARATUS FOR DEHYDRATING EMULSIONS

Application filed August 8, 1927. Serial No. 211,412.

My invention relates to the art of electrical treatment of fluids, and has a particular utility in the treatment of petroleum emulsions in which capacity it will be particularly applied, though I do not wish to limit myself to the use of an emulsion as a fluid.

Petroleum sometimes carries particles of water or other liquid which are of such fineness as to form an emulsion with the petroleum. A well known method of separating the components of this emulsion is to subject it to the action of an electrical field of high potential formed between a pair of electrodes. This field causes the fine suspended liquid particles to agglomerate and form fairly large drops. These drops if formed of a liquid conductor such as a water solution or other electrolyte tend to form chains extending between and short circuiting the electrodes. Many different means have been devised to prevent the formation of these short circuiting chains and facilitate the removal of the large drops of conducting liquid from the space in which the electric field is formed so that these drops may unite and separate out of the oil by gravity. None of the means yet devised for this purpose has proved to be entirely satisfactory.

It is an object of my invention to provide a method of and apparatus for treating fluids which operates in a novel manner to prevent the formation of short circuiting liquid chains in the fluid.

In most of the methods of preventing short circuiting, the emulsion being treated is agitated a uniform degree during the different stages of the treatment. Thus the degree of agitation sufficient to prevent short circuiting at the start of the treatment is inadequate to prevent short circuiting towards the end of the treatment where the conducting liquid is almost completely separated from the oil.

It is a further object of my invention to provide a method of and apparatus for treating fluids in which the fluid being treated is agitated to a varying degree during the progress of the treatment.

As the treatment progresses and the globules of conducting liquid gradually increase in size, they tend to drop and separate out of the emulsion by gravity. I have discovered that at this time mechanical agitation is particularly effective in helping to agglomerate the drops of conducting liquid if applied only in a lower portion of the treating space.

It is a still further object of my invention to provide a method of and apparatus for treatment of fluids in which the fluid being treated is agitated only in a lower portion of the treating space.

Mechanical agitators have previously been devised which are operated by a discharge of the incoming emulsion at the periphery of the agitator so that very little agitating effect is had upon the emulsion after it has been discharged from the agitator.

Another object is to provide an emulsion treater in which an agitator is operated by the incoming fluid so that after the discharge of the fluid it must pass practically entirely through the field in which the agitator operates.

Limited areas of maximum potential gradient have been found very valuable in accelerating the electrical dehydration process but in the past these areas have been stationary and consequently favored the formation of short circuiting chains at the positions where they were located.

It is a further object of my invention to provide a method of and apparatus for treating fluids in which moving areas of maximum potential gradient are utilized in the treating field.

Further objects and advantages will be manifest in the following description and drawings in which a preferred embodiment of the treater of my invention is illustrated.

In the drawings, Fig. 1 is a vertical sectional view diagrammatically illustrating the treater of my invention.

Fig. 2 is a horizontal sectional view taken on the line 2—2 of Fig. 1.

Fig. 3 is a vertical sectional view illustrating a preferred form of upper bearing for the agitator of my invention.

Referring specifically to the drawings, the numeral 10 indicates the treater of my invention which includes a shell 11 having a tight cover 12 and a tight bottom 13 which cooperate with the shell 11 to form a treating chamber 14.

Leading from the upper end of the space 14 is an oil outlet pipe 18 which extends through the cover 12 of the tank 11. A water outlet pipe 28 connects with the lower portion of the treating chamber 14 through the bottom 13.

Supported centrally within the space 14 by arms 30 attached to the side wall 17 is a grounded electrode 31. The arms 30 are attached to the lower end of an electrode stem 32 which extends upwardly and unites centrally with a frusto-conical plate 33 which forms the body of the electrode 31 and which slopes downwardly from the center toward the periphery thereof.

An emulsion inlet pipe 34 extends horizontally through the shell 11 into the lower portion of the chamber 14 and its inner end is supported by a bracket 35, resting upon the shell bottom 13, and connects to the lower end of a vertical tube 36 which extends upwardly through the electrode neck 32. The upper end of the tube 36 is covered by a cap 37, as clearly shown in Fig. 3, which has radial emulsion outlet openings 38 formed therein and also has an axial opening 39. Formed in the upper face of the cap 37 is an anti-friction bearing seat 40.

Resting in this seat and supporting the hub 42 of an agitator 43 is an anti-friction bearing 41. The agitator 43 includes arms 44, preferably comprising metal rods which extend radially from the hub 42 so as to lie adjacent to the upper surface of the electrode plate 43 and terminate near the periphery of this plate.

The lower end of the tube 36 is closed and is provided with an opening through which an agitator drive shaft 48 extends, there being a beveled gear 49 provided on the lower end of this shaft. This shaft 48 passes upwardly through the tube 36, the opening 39 of the cap 37, through the bearing 41, and is received in a central opening 50 provided in the agitator hub 42.

A key 51 locks the hub 42 against rotation upon the shaft 48.

A helical fin 55 is formed upon the shaft 48, as shown, and extends practically throughout the length of the tube 36.

A control rod 56 is horizontally disposed beneath the emulsion inlet pipe 34 and is journalled in a stuffing box 57 provided in the shell wall 17 and in the bracket 35, there being a beveled gear 58 provided on the inner end of the rod 56 which meshes with the beveled gear 49. Any suitable means may be provided upon the outer end of the rod 56, for controlling the rate of its rotation, such as a hand-wheel 59.

Suspended by an insulator 60, from the cover 12 so as to be superimposed over and spaced from the grounded electrode 31 in a manner to form a treating space therebetween, is a live electrode 65. The electrode 65 has a body 66 formed of a frusto-conical plate, the sides of which diverge at substantially the same pitch as the sides of the plate 33. The body 66 is provided with nail holes 67 and is covered with a canvas 68. Formed centrally upon the plate 66, is an internally threaded neck 70, into which a screw eye 71 is threadedly received, the screw eye 71 being connected by a wire 72 to the insulator 60. By rotation of the electrode 65, relative to the screw 71, the height of the electrode 65 above the electrode 31 may be adjusted. The adjustment is maintained by a lock nut 74 which is screwed downwardly upon the screw eye 71 against the neck 70.

The live electrode 65 is adapted to be energized by an electric conductor 75 which leads from the screw eye 71 through an insulator 76 provided in the cover 12 and connects to one terminal of a secondary 77 of a transformer 78. The other terminal of the secondary 77 is grounded by a conductor 79 to the shell 11 which in turn may be grounded to the earth as by a conductor 80.

While the novel method and apparatus of my invention may be utilized in separating the constituents of many different kinds of emulsions, they are especially adapted for the dehydration of water and petroleum emulsions. I shall therefore describe the operation of my invention when applied to this use with the express understanding that the invention may be used in treating other fluids of quite a different character.

The first step in preparing the treater 10 for operation is to fill the treating chamber 14 with a substantially dielectric oil, which preferably consists of a dry petroleum of similar quality to the petroleum in the emulsion to be treated. The transformer 78 is then energized from any suitable source of electric current so as to set up a high potential field in the treating space between the live electrode 65 and the grounded electrode 31.

Emulsion is now forced through the inlet pipe 34. This emulsion passes upwardly into the tube 36 and out through the radial holes 38 of the cap 37 and through the treating space. As the emulsion flows upward through the tube 36, it acts upon the helical fin 55 so as to cause rotation of the shaft 48 and the agitator 43. Thus as the emulsion flows down over the upper surface of the grounded electrode 31, it is agitated by the rods 44 to a degree in direct proportion to the distance to which the emulsion has proceeded from the cap 37. Due to the high potential field between the electrodes 65 and 31, the dehydration of the emulsion begins at once upon its passage from the openings 38 and continues as the emulsion flows toward the periphery of the electrode 31. Thus the agitation of the emulsion, during this treating by the rods 44, is proportional to the progress of the dehydration of the emulsion.

This is a distinct advantage of my invention, as a greater degree of agitation is necessary as the dehydration progresses to prevent the formation of short circuiting chains of water globules in the emulsion, especially inasmuch as the velocity of the fluid changes as it moves outward in the treating space. In the form of the invention shown, the fluid decreases in velocity as it moves outward, due to the increased cross-sectional area of the treating space in a direction perpendicular to the direction of flow of the fluid.

Another feature of the treater 10 is the rotation of the agitator 43 by the incoming emulsion and, at the same time, the discharge of the emulsion so that it must flow through substantially the entire area swept over by the agitator while it is being treated.

Due to the fact that the agitator 43 is grounded and that the rods 44 thereof pass very close to the grounded electrode 31, these rods 44 comprise an auxiliary electrode so that there is a maximum potential gradient area set up adjacent to each of the rods 44. These areas, moving as they do with the rods 44, have a distinctly novel action upon the emulsion, especially as the emulsion in the vicinity of the rods is very actively agitated by the movement of the rods.

By the time the emulsion has passed beyond the outer edge of the electrode 31, the particles of water are agglomerated into large drops which rapidly settle downward. As this water collects in the bottom of the chamber 14, it is drawn off through the pipe 28. Being lighter than the water or the emulsion, the oil separated from the emulsion rises in the upper end of the tank and is drawn off through the pipe 18.

During the dehydration process, the rate of rotation of the agitator 43 may be learned by observation of the hand-wheel 59, which rotates at substantially the same speed as the agitator. If, for any reason, the agitator should become stuck temporarily, the hand-wheel 59 could be manipulated to start the agitator rotating, after which this rotation would be continued by the action of the emulsion on the helical fin 55.

In case it was desired to have the agitator 43 rotate at less speed than normally, the outer end of the shaft 56 could be supplied with suitable braking means in place of the hand-wheel 59. By the control of such a braking means any desired speed of the agitator 43 below the normal could be attained.

While my treater is particularly described in relation to the dehydration of a petroleum emulsion it should be clear that various fluids could be advantageously treated for such a purpose as separating various constituents thereof. Thus my invention comprehends the treatment of any fluid and should not be construed to be limited to petroleum emulsions.

I claim as my invention:

1. A method of treating a fluid which consists in establishing an electric field of high potential between a pair of superimposed electrodes, passing a fluid through said field, and agitating said fluid lying adjacent to the lower of said electrodes.

2. A method of treating a fluid which consists in establishing an electric field of high potential between a pair of superimposed electrodes, passing a fluid through said field, and agitating said fluid adjacent to the lower of said electrodes, the degree of said agitation varying as the treatment of said fluid in said field progresses.

3. A method of treating a fluid which consists in establishing an electric field of high potential between a pair of superimposed electrodes, passing a fluid through said field at a substantially uniformly varying velocity, and agitating said fluid lying adjacent to the lower of said electrodes.

4. A method of treating a fluid which consists in establishing an electric field of high potential between a pair of superimposed electrodes, passing a fluid through said field at a substantially uniformly varying velocity, and agitating said fluid lying adjacent to the lower of said electrodes, the degree of said agitation increasing as the treatment of said fluid in said field progresses.

5. A method of treating a fluid which consists in establishing an electric field of high potential, passing a fluid through said field at a decreasing velocity, and agitating said fluid, the degree of said agitation varying as the treatment of said fluid in said field progresses.

6. A method of treating fluid which consists in establishing an electric field of high potential between a pair of superimposed electrodes, passing a fluid through said field at a decreasing velocity, and agitating said fluid lying adjacent to the lower of said electrodes, the amount of agitation increasing as the velocity of said fluid through said field decreases.

7. A method of treating a fluid which consists in establishing an electric field between a pair of electrodes, passing a fluid through said field and establishing adjacent one of said electrodes, an area of maximum potential gradient which moves at an increasing velocity relative to said fluid as the treatment thereof progresses.

8. In a treater, the combination of: walls defining a treating space having a fresh fluid inlet and a treated fluid outlet, said inlet and outlet being located relative to said space to cause said fluid during treatment to pass through said space between the central portion and the periphery thereof; means for setting upon an electric field in said space; an agitator disposed in said space between said inlet and said outlet; and means operated by incoming fresh fluid to rotate said agitator.

9. In a treater, the combination of: a pair of electrodes forming a treating space; an agitator mounted to rotate in said space; and means operated by a fluid supplied to said treater for treatment to rotate said agitator, said fluid being exhausted by said means in a central portion of said treating space.

10. In a treater, the combination of: a pair of superimposed electrodes forming a treating space; an agitator mounted to rotate in said space; and means operated by a fluid supplied to said treater for treatment to rotate said agitator, said fluid being exhausted by said means in a central portion of said treating space.

11. In a treater, the combination of: a pair of electrodes forming a treating space; an agitator mounted to rotate in said space; and means operated by a flow of fluid supplied to said treater for rotating said agitator.

12. In a treater, the combination of: a pair of conical electrodes defining a treating space; an agitator having arms adapted to move through said space; and means for moving said agitator in said treating space.

13. A combination as defined in claim 11 including means operable from the exterior of said treater for varying the amount of rotation of said agitator.

14. In a treater, the combination of: a pair of electrodes defining a treating space, the cross-sectional area of which, perpendicular to the flow of fluid therethrough, increases; and an agitator movable in said treating space to agitate said fluid in said treating space in a degree which is a function of the cross-sectional area of said treating space.

15. In a treater, the combination of: a pair of horizontally disposed electrodes; means for supplying a stream of fluid to be treated into the central portion of a treating space defined by said electrodes; an agitator in said treating space; and means turning under the influence of said stream of fluid for rotating said agitator.

16. A combination as defined in claim 15 in which said agitator conforms to the shape of the lower of said electrodes and rotates in close proximity thereto.

17. A method of treating a fluid which consists in establishing a high potential electric field, passing the fluid to be treated through said field in such a manner that the velocity thereof in a primary portion of said field is greater than the velocity in a secondary portion of said field, gently agitating said fluid in said primary portion of said field, and more vigorously agitating said fluid in said secondary portion of said field.

In testimony whereof, I have hereunto set my hand at Los Angeles, California, this 2nd day of August, 1927.

LEVERING LAWRASON.